United States Patent
Battle et al.

(10) Patent No.: US 11,709,676 B2
(45) Date of Patent: Jul. 25, 2023

(54) INFERRING FUTURE VALUE FOR SPECULATIVE BRANCH RESOLUTION

(71) Applicant: International Business Machines Corporation, Armonk, NY (US)

(72) Inventors: Steven J. Battle, Philadelphia, PA (US); Brian D. Barrick, Pflugerville, TX (US); Dung Q. Nguyen, Austin, TX (US); Richard J. Eickemeyer, Rochester, MN (US); John B. Griswell, Jr., Austin, TX (US); Balaram Sinharoy, Poughkeepsie, NY (US); Brian W. Thompto, Austin, TX (US); Tu-An T. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/406,186

(22) Filed: Aug. 19, 2021

(65) Prior Publication Data
US 2023/0053981 A1 Feb. 23, 2023

(51) Int. Cl.
*G06F 9/30* (2018.01)
*G06F 9/38* (2018.01)

(52) U.S. Cl.
CPC ...... *G06F 9/30058* (2013.01); *G06F 9/30021* (2013.01); *G06F 9/3857* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 6,938,151 B2 | 8/2005 | Bonanno et al. | |
| 7,689,812 B2 | 3/2010 | Abernathy et al. | |
| 9,383,999 B2 | 7/2016 | Seal et al. | |
| 9,928,075 B2 | 3/2018 | Alexander et al. | |
| 10,007,522 B2 | 6/2018 | Scott et al. | |
| 10,048,969 B2 | 8/2018 | Okazaki et al. | |
| 10,747,545 B2 | 8/2020 | Genden et al. | |
| 10,761,856 B2 | 9/2020 | Ward et al. | |
| 2014/0281438 A1* | 9/2014 | Abdallah | G06F 9/3806 712/238 |
| 2016/0092217 A1 | 3/2016 | Gonion et al. | |
| 2018/0004527 A1* | 1/2018 | Adeeb | G06F 9/30094 |

(Continued)

OTHER PUBLICATIONS

Koppelman, "Early Branch Resolution Using a Fast Pre-Execution Core on a Dynamically Scheduled Processor," Deptartment of Electrical & Computer Engineering, Louisiana State University, Sep. 2001, pp. 1-13.

(Continued)

*Primary Examiner* — John M Lindlof
(74) *Attorney, Agent, or Firm* — Cantor Colburn LLP; Nicholas Welling (57) ABSTRACT

Aspects of the invention include includes determining a first instruction in a processing pipeline, wherein the first instruction includes a compare instruction, determining a second instruction in the processing pipeline, wherein the second instruction includes a conditional branch instruction relying on the compare instruction, determining a predicted result of the compare instruction, and completing the conditional branch instruction using the predicted result prior to executing the compare instruction.

18 Claims, 4 Drawing Sheets

(56) References Cited

U.S. PATENT DOCUMENTS

2020/0004546 A1   1/2020  Genden et al.
2020/0004551 A1*  1/2020  Vasekin ................ G06F 9/3865
2020/0310815 A1  10/2020  Ayupov et al.
2021/0011729 A1   1/2021  Mukherjee et al.

OTHER PUBLICATIONS

Mahlke et al., "Compiler Synthesized dynamic Branch Prediction," Proceedings of the 29th Annual IEEE/ACM International Symposium on Microarchitecture, Dec. 2-4, 1996, 11 pages.
Parashar et al., "Triggered Instructions: A Control Paradigm For Spatially-Programmed Architectures," 40th Annual International Symposium on Computer Architecture, ISCA, 2013, 12 pages.
Raasch et al., "A Scalable Instruction Queue Design Using Dependence Chains," Proceedings of the 29th Annual International Symposium on Computer Architecture, May 25-19, 2002, 12 pages.
Youssif et al., "Comparison Of branch Prediction Schemes for Superscalar Processors ICEEC 2004," International Conference on Electrical, Electronic and Computer Engineering, Sep. 5-7, 2004, pp. 257-260.

* cited by examiner

INFERRING FUTURE VALUE FOR SPECULATIVE BRANCH RESOLUTION

BACKGROUND

The present invention generally relates to an out-of-order (OoO) processor, and more specifically, to inferring future value for speculative branch resolution in an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues. Multiple instructions can be dispatched to the one or more issue queues per cycle. The one or more issue queues can be shared by one or more threads.

SUMMARY

Embodiments of the present invention are directed to methods for inferring future value for speculative branch resolution. A non-limiting example computer-implemented method includes determining a first instruction in a processing pipeline, wherein the first instruction includes a compare instruction, determining a second instruction in the processing pipeline, wherein the second instruction includes a conditional branch instruction relying on the compare instruction, determining a predicted result of the compare instruction, and completing the conditional branch instruction using the predicted result prior to executing the compare instruction.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a system and method for speculatively resolving branch instructions in a processing pipeline by inferring future values of an immediate compare instruction. The inferred value of the compare instruction is determined using a branch predictor and the branch instruction can be completed without the need to wait until execution of the immediate compare instruction. When an instruction sequencing unit is dispatching two instructions that are a compare instruction and a conditional branch instruction, the typical resolution of the branch condition is done after execution of the compare instruction. However, one or more embodiments of the present invention, infers the compare instruction value and utilizes this inferred value for the branch condition and resultant sequence of instructions.

Figure 1:
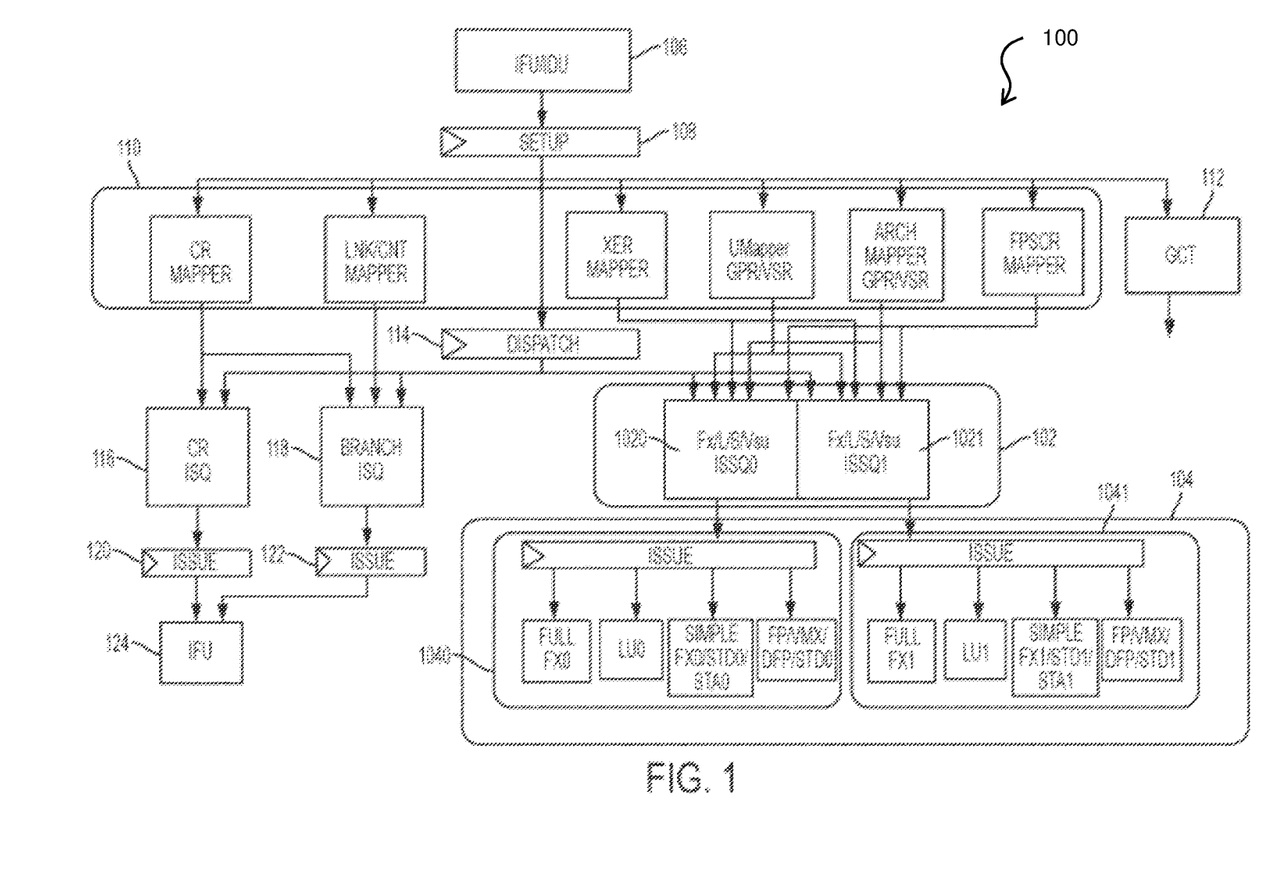
FIG. 1 depicts a block diagram of a system that includes an instruction sequencing unit (ISU) of an out-of-order (OoO) processor in accordance with one or more embodiments of the present invention.

Turning now to FIG. 1, a block diagram of a system 100 that includes an instruction sequencing unit (ISU) of an out-of-order (OoO) processor for implementing speculative branch resolution using inferred future values is generally shown according to one or more embodiments of the present invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in MT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FPNMX/DFP/STD0 form a load-store unit (LSU) 1042. Similarly, the LU1, the Simple FX1/STD1/STA1, and the FP/VMX/DFP/STD1 form a load-store unit (LSU) 1043. As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
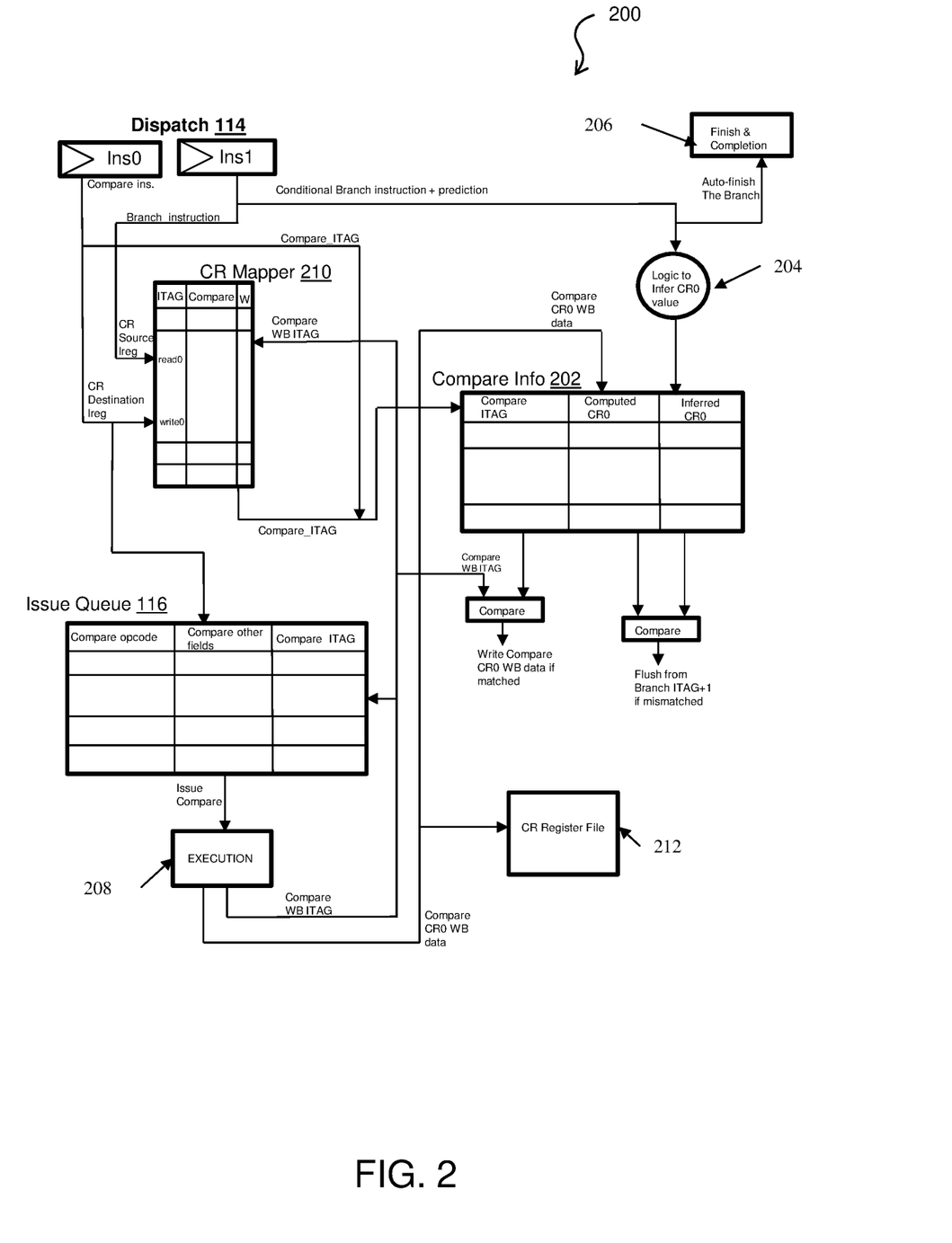
FIG. 2 depicts of block diagram of an instruction sequencing unit that infers future values for speculative branch resolution according to one or more embodiments of the invention.

FIG. 2 depicts a block diagram of an instruction sequencing unit (ISU) 200, utilizing a compare information table 202 for speculative branch resolution according to one or more embodiments of the invention. The ISU 200 is similar to the ISU 100 with the addition of a compare information queue 202 when dispatch 114 is interacting with a conditional register (CR) mapper 210 and CR issue queue (ISQ) 116. The ISU 200, in a central processing unit (CPU) is responsible for organizing program instructions to be fetched from memory, and executed, in an appropriate order, and for forwarding them to an execution unit. The ISU 200 may also do, e.g., address resolution, pre-fetching, prior to forwarding an instruction. The ISU 200 is a part of the control unit, which in turn is part of the CPU. The ISU 200 includes the dispatch unit 114 which typically is responsible for receiving instructions from the IFU and routing them to the different execution lanes within the ISU 200. Dispatch unit 114 primarily interfaces with the mappers (e.g., conditional register (CR) mapper 210) where it sends the routed instructions along with other instruction information such as source logical register, instruction type, etc. to allow the instruction to be renamed before being sent to the issue queue (ISQ) 116 where it can be issued and executed. There are four full lanes transmitted from the IFU/IDU 106. Each of the four lanes can have up to two (2) PowerPC® (PPC) instructions.

In one or more embodiments of the invention, the ISU 200 includes a queue referred to as the compare information queue 202 for storing inferred (predicted) compare instruction values when a compare instruction is received with a conditional branch instruction. Typically, when a compare instruction and conditional branch instruction are received, the conditional branch instruction cannot execute because it is waiting for the compare instruction to produce a result before the compare can be issued and executed. However, in one or more embodiments of the present invention, the ISU 200 allows for the conditional branch instruction to skip waiting for the compare immediate instruction to execute. The conditional branch instruction executes using an inferred value, or predicted result, of the compare instruction. With the inferred compare instruction value, the conditional branch instructions can auto-finish (i.e., zero cycle execution) at dispatch time without going through execution. When the compare instruction is executed and has written back its data, the correct compare value can be computed and then compared to the previously inferred value. If the computed compare value is the same as the inferred value, then the code instruction stream can continue as normal. However, if the computed compare value is not the same as the inferred value, then a processing pipeline flush from the branch instruction will be initiated to re-fetch the instructions after the branch instruction. By allowing the conditional branch instruction to zero-cycle execute, the conditional branch instruction is resolved speculatively earlier and consumes fewer processor resources than prior techniques, allowing for improved performance of the processor.

In one or more embodiments of the invention, the ISU 200 follows a process flow indicated with the various arrows and descriptors in FIG. 2 where dispatch 114 receives a set of two instructions (Ins0, Ins1). Ins0 is a compare instruction that is executed before the next instruction, Ins1. Ins1 is a conditional branch instruction. Initially, dispatch 114 determines that Ins0 is a compare instruction being dispatched. In response, dispatch 114 writes the compare Ins0 instruction tag (ITAG) (for conditional register destination) into the CR Mapper 210. The conditional register (CR) is split into eight 4-bit fields, each filed is individually mappable/addressable (CR0 through CR7). In the CR Mapper 210, the compare bit (first bit) is set to 1 to indicate that a compare instruction is updating this CR0 field. The W bit (second bit) is set to 0 to indicate that the compare instruction (Ins0) has not written back its data. Then, dispatch 114 determines that a conditional branch instruction (Ins1) is being dispatched. At this point, dispatch 114 will not read the CR mapper 210 from the compare instruction (Ins0) ITAG, Compare bit, and W bit using the logical registers storing this data. If the compare bit is 1 and the W bit is 0, dispatch 114 writes the Ins0ITAG read out from the CR mapper 210 into the Compare Info Queue 202. However, if the compare instruction (Ins0) was already executed and has written back its data (i.e., W=1), then dispatch 114 will not write the Ins0 ITAG into the Compare Info Queue 202. In this case, there is no need to infer the compare value because the instruction has already been executed.

In one or more embodiments of the invention, dispatch 114 infers the compare value (inferred CR0) and writes this value into the "inferred CR0" field in the Compare Info Queue 202. Note, if Ins0 has already executed (i.e., W=1), then the inferred CR0 value is not written into the Compare Info Queue 202. In one or more embodiments of the invention, when the inferred CR0 value is written into the Compare Info Queue 202, the CR0 inferring logic 204 is activated. The branch instruction (Ins1) ITAG from dispatch 114 is sent to the finish and completion block 206 without execution. Note, if the compare instruction (Ins0) and the branch instruction (Ins1) are dispatched in the same cycle, then the compare ITAG will be bypassed from the CR mapper 210 to write into the Compare Info Queue 202.

The branch instruction is not executed. One or more embodiments of the invention, assumes the branch prediction is correct and removes the instruction from the instruction stream, and does not write the instruction into the issue queue. For example, consider the following: if (x>y) {insns a, b, c} else {insns d, e, f}. The predictor makes a prediction of what the branch will do, and will fetched something like: compare insn, branch insn, insn a, insn b, insn c. If the prediction is incorrect, flush the insns a, b, c and fetch insns d, e, and f instead.

Previous approaches perform the following: "itag 1 is a compare insn, looking at 2 registers and writing a result in CR0", "itag 2 is a conditional branch instruction, it looks at CR0 before executing. The branch must issue to the branch execution unit to read CR0 and update the branch history table. If the branch is true, fetch from address "x", if false, fetch from address "y". The predictor has made a prediction and has started fetching itags a, b, c and so on, from either, If the prediction is wrong, flush itags a, b, c and younger and refetch from the other address and get d, e, f."

One or more embodiments of the invention perform the following: "itag 1 is a compare insn, looking at 2 registers and writing a result in CR0", "itag 2 is a conditional branch. It can infer the value of CR0 used in the prediction. It does not have to wait for itag 1 to write back. Itags a, b, c, and so on can start executing right away. If the prediction is incorrect, i.e. the CR0 value from itag 1 does not match the inferred value from the prediction, then flush itags a, b, c and refetch d, e, f.

In one or more embodiments of the invention, the conditional branch instruction (Ins1) is not written into the issue queue 116. When the compare instruction (Ins0) is issued for execution 208 (e.g., from the issue queue 116), the execution block 208 will send the Ins0 Write Back ITAG to the Compare Info Queue 202 where it will be compared with the stored Compare ITAG. If the ITAGs match, then the Compare Write Back (WB) CR0 result will be written into the "Computed CR0" field of the Compare Info Queue 116. The WB CR0 value will then update the CR register file 212 and the Compare WB ITAG is also updated in the CR Mapper 210 and Issue Queue 116 to "wake up" dependent instructions.

In one or more embodiments of the invention, the computed CR0 value is compared with the stored inferred CR0 value in the Compare Info Queue 202. If the compare result is a match, then the branch prediction was correct and no further action is required. However, if the computer CR0 value is not the same as the inferred CR0 value, then the branch prediction was incorrect. In this case, a flush from Ins1 ITAG+1 is generated to flush out the incorrect instruction stream and then the correct instructions after the branch are re-fetched.

Figure 3:
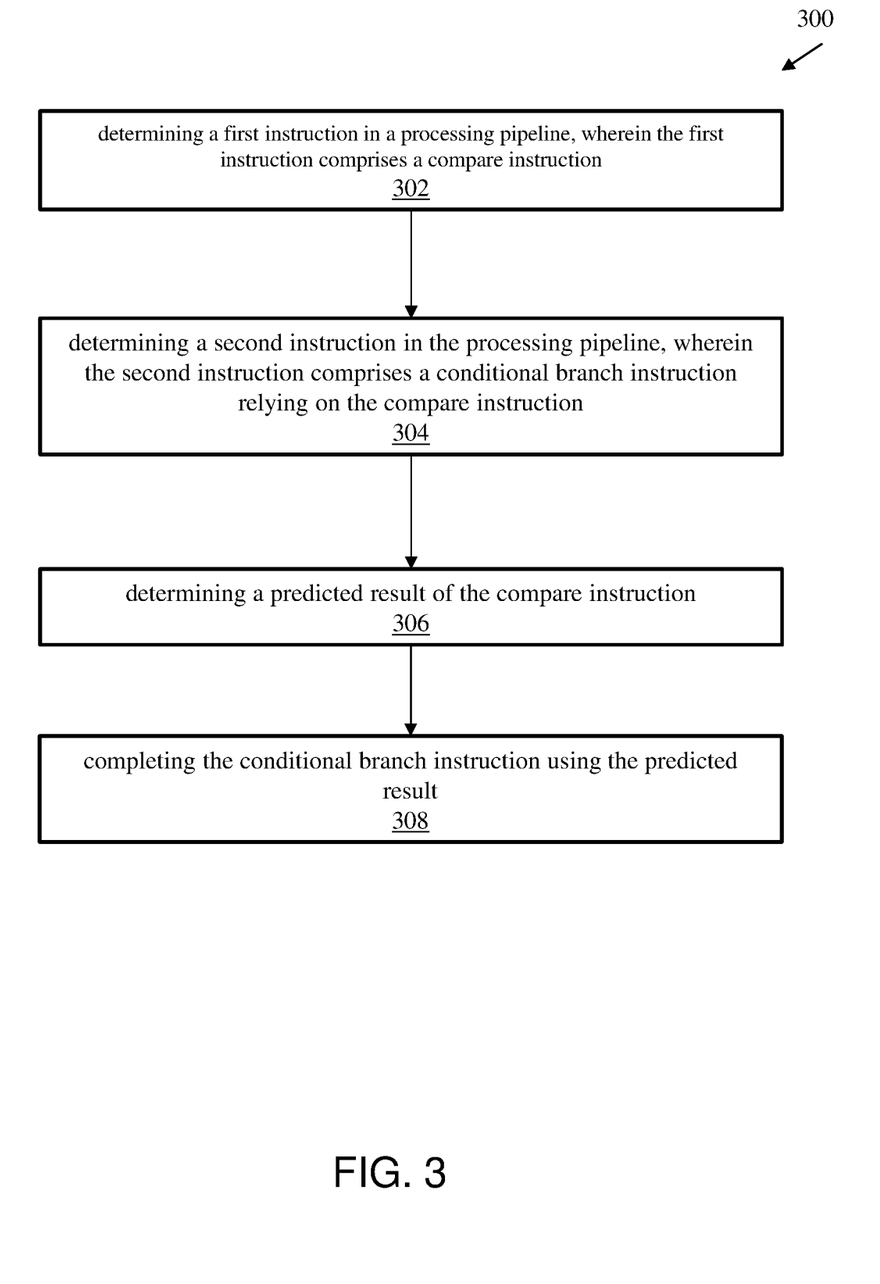
FIG. 3 depicts a flow diagram of a method 300 for inferring future value for speculative branch resolution according to one or more embodiments of the invention.

FIG. 3 depicts a flow diagram of a method 300 for inferring future value for speculative branch resolution according to one or more embodiments of the invention. At least a portion of the method 300 can be executed, for example, by the processor 401 shown in FIG. 4. The method 300 includes determining a first instruction in a processing pipeline, wherein the first instruction comprises a compare instruction, as shown at block 302. At block 304, the method 300 includes determining a second instruction in the processing pipeline, wherein the second instruction comprises a conditional branch instruction relying on the compare instruction. The conditional branch is dependent on the compare instruction result. So in block 306, the method 300 includes determining a predicted result of the compare instruction. And at block 308, the method includes completing the conditional branch instruction using the predicted result. Thus, a zero cycle move at dispatch occurs with the conditional branch instruction based on the inferred value. If the inferred value is incorrect, a pipeline flush occurs. However, if the inferred value is correct, the branch executes faster because it does not wait on the compare result.

Additional processes may also be included. It should be understood that the processes depicted in FIG. 3 represent illustrations, and that other processes may be added or existing processes may be removed, modified, or rearranged without departing from the scope and spirit of the present disclosure.

Figure 4:
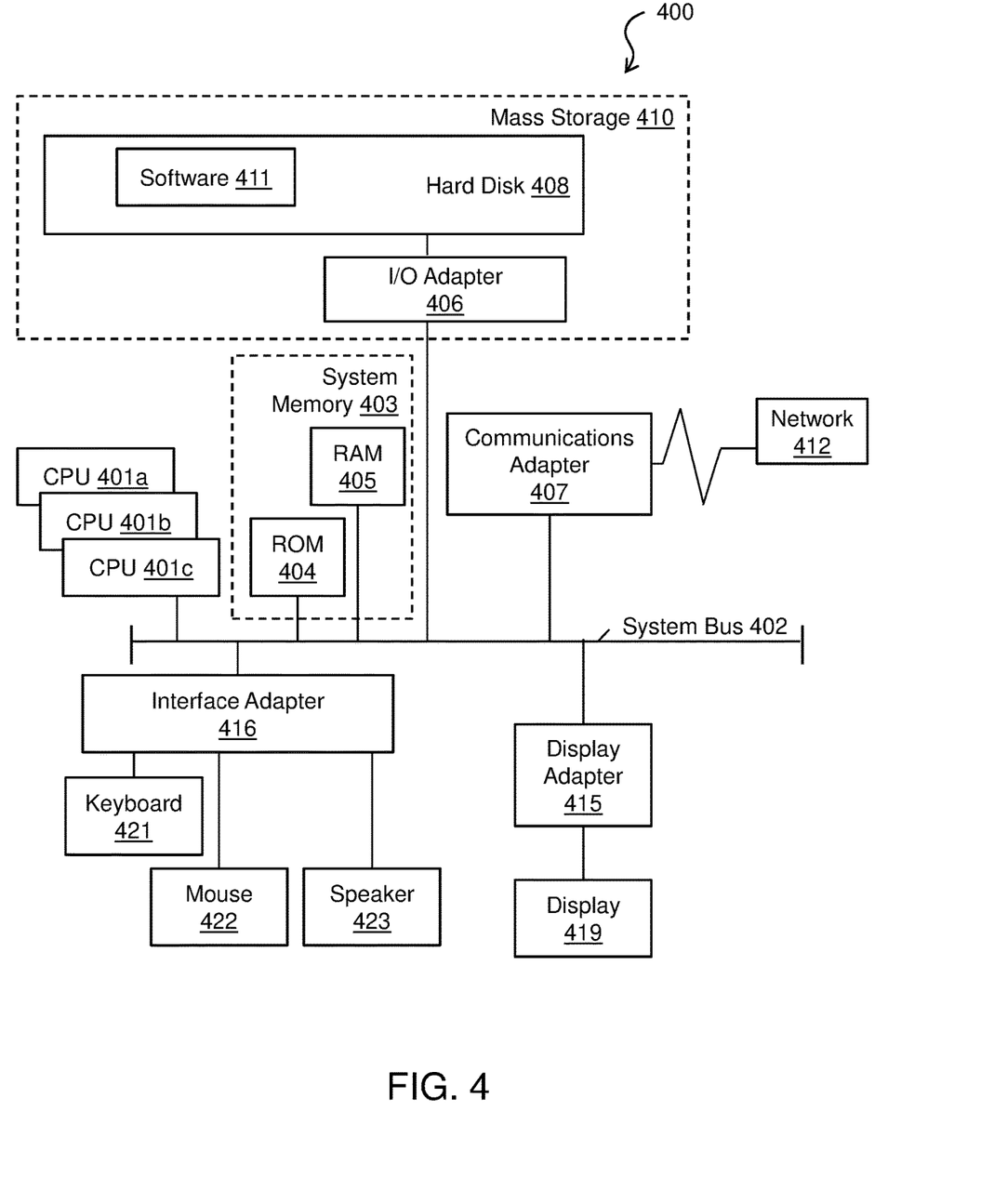
FIG. 4 depicts a computer system in accordance with one or more embodiments of the present invention.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 404 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 404, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining a first instruction in a processing pipeline, wherein the first instruction comprises a compare instruction;
   determining a second instruction in the processing pipeline, wherein the second instruction comprises a conditional branch instruction relying on the compare instruction;
   determining a predicted result of the compare instruction;
   completing the conditional branch instruction using the predicted result prior to executing the compare instruction;
   writing a first instruction tag into a conditional register mapper comprising one or more individually addressable N-bit fields;
   setting a first bit to one in a first N-bit field of the conditional register mapper based on the first instruction comprising a compare instruction;
   setting a second bit to zero in the first N-bit field of the conditional register mapper based on the first instruction not being executed and written back; and
   responsive to the first bit having a value of one and the second bit having a value of zero in the first N-bit field of the conditional register mapper, writing the first instruction tag read out from the conditional register mapper into a first field of a compare info queue.

2. The computer-implement method of claim 1, further comprising executing the compare instruction to determine a calculated result.

3. The computer-implemented method of claim 2, further comprising:
   determining a branch miss based on the calculated result not matching the predicted result; and
   performing a pipeline flush responsive to the branch miss.

4. The computer-implemented method of claim 1, wherein the predicted result of the compare instruction is determined based on a branch prediction algorithm.

5. The computer-implemented method of claim 1, further comprising:
   writing the predicted result of the compare instruction to a second field of the compare info queue, wherein the compare info queue comprises a register.

6. The computer-implemented method of claim 1, wherein the first instruction is written into an issue queue.

7. A system comprising:
   a memory having computer readable instructions; and
   one or more processors for executing the computer readable instructions, the computer readable instructions controlling the one or more processors to perform operations comprising:
   determining a first instruction in a processing pipeline, wherein the first instruction comprises a compare instruction;
   determining a second instruction in the processing pipeline, wherein the second instruction comprises a conditional branch instruction relying on the compare instruction;
   determining a predicted result of the compare instruction;
   completing the conditional branch instruction using the predicted result prior to executing the compare instruction;
   writing a first instruction tag into a conditional register mapper comprising one or more individually addressable N-bit fields;

setting a first bit to one in a first N-bit field of the conditional register mapper based on the first instruction comprising a compare instruction;

setting a second bit to zero in the first N-bit field of the conditional register matter based on the first instruction not being executed and written back; and responsive to the first bit having a value of one and the second bit having a value of zero in the first N-bit field of the conditional register mapper, writing the first instruction tag read out from the conditional register mapper into a first field of a compare info queue.

8. The system of claim 7, wherein the operations further comprise: executing the compare instruction to determine a calculated result.

9. The system of claim 8, wherein the operations further comprise:

determining a branch miss based on the calculated result not matching the predicted result; and performing a pipeline flush responsive to the branch miss.

10. The system of claim 7, wherein the predicted result of the compare instruction is determined based on a branch prediction algorithm.

11. The system of claim 7, wherein the operations further comprise:

writing the predicted result of the compare instruction to a second field of the compare info queue, wherein the compare info queue comprises a register.

12. The system of claim 7, wherein the first instruction is written into an issue queue.

13. A computer program product comprising a computer readable storage medium having program instructions embodied therewith, the program instructions executable by one or more processors to cause the one or more processors to perform operations comprising:

determining a first instruction in a processing pipeline, wherein the first instruction comprises a compare instruction;

determining a second instruction in the processing pipeline, wherein the second instruction comprises a conditional branch instruction relying on the compare instruction;

determining a predicted result of the compare instruction;

completing the conditional branch instruction using the predicted result;

writing a first instruction tag into a conditional register mapper comprising one or more individually addressable N-bit fields;

setting a first bit to one in a first N-bit field of the conditional register mapper based on the first instruction comprising a compare instruction;

setting a second bit to zero in the first N-bit field of the conditional register matter based on the first instruction not being executed and written back; and responsive to the first bit having a value of one and the second bit having a value of zero in the first N-bit field of the conditional register mapper, writing the first instruction tag read out from the conditional register mapper into a first field of a compare info queue.

14. The computer program product of claim 13, wherein the operations further comprise: executing the compare instruction to determine a calculated result.

15. The computer program product of claim 14, wherein the operations further comprise:

determining a branch miss based on the calculated result not matching the predicted result; and performing a pipeline flush responsive to the branch miss.

16. The computer program product of claim 13, wherein the predicted result of the compare instruction is determined based on a branch prediction algorithm.

17. The computer program product of claim 13, wherein the operations further comprise:

writing the predicted result of the compare instruction to a second field of the compare info queue, wherein the compare info queue comprises a register.

18. The computer program product of claim 13, wherein the first instruction is written into an issue queue.

* * * * *